Feb. 21, 1967 W. H. WILLIAMS, JR 3,305,203
RADIO AND APPARATUS FOR ATTACHMENT THEREOF UNDERNEATH
THE DASHBOARD OF A VEHICLE
Filed July 23, 1965
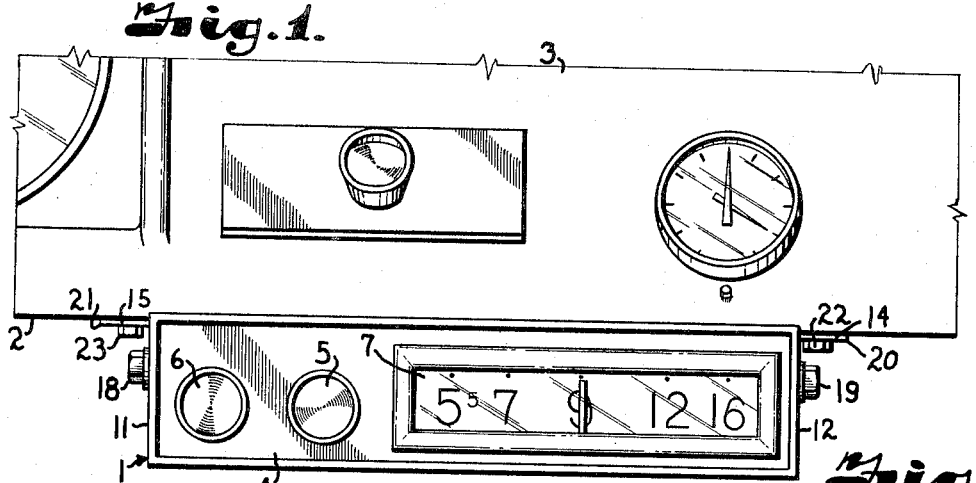
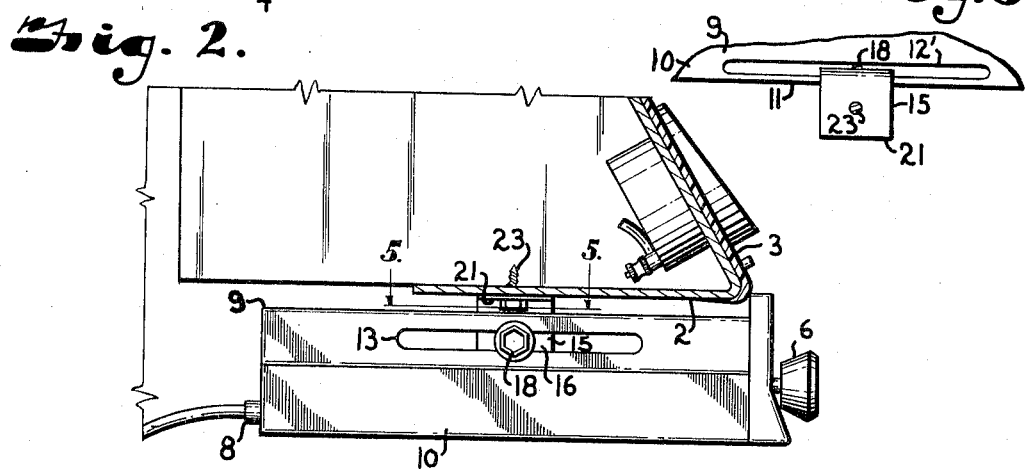
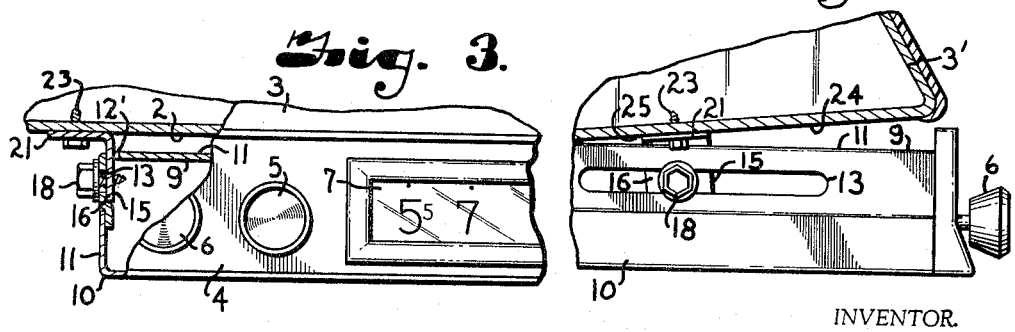
INVENTOR.
WADE H. WILLIAMS JR.
BY
*Fishburn & Gold*
ATTORNEYS

United States Patent Office 3,305,203
Patented Feb. 21, 1967

---

3,305,203
RADIO AND APPARATUS FOR ATTACHMENT THEREOF UNDERNEATH THE DASHBOARD OF A VEHICLE
Wade H. Williams, Jr., 8720 Fairway, Leawood, Kans. 66206
Filed July 23, 1965, Ser. No. 474,288
9 Claims. (Cl. 248—201)

This invention relates to a radio and means of mounting the same underneath the dashboard of an automobile, boat or the like.

Heretofore, radios in automobiles, boats and the like are usually mounted through an opening in the front panel of the dashboard of such vehicle and require various kits and tools for mounting of such radios in the dash. Different types of automobiles require different mountings and different tools to so mount the radios. In the old type mounting there was required to be drilling or cutting in the dashboard or bottom thereof and the use of metal straps or the like for supporting the radio in the dashboard of the vehicle.

The principal object of the present invention is to provide a configuration for the radio housing so that it will be adapted to readily engage the underneath side of the dashboard of the vehicle and conserve space therein and to provide a mounting for such radio requiring few parts and tools for assembling and mounting the radio under the dashboard.

Other objects of the present invention are to provide a radio of considerably less width than the length thereof and of a small thickness wherein the thickness is considerably less than the width of the radio so as to conserve space in the vehicle; to provide a slot in the top of the housing of the radio adjacent the end edges thereof; to provide slots in the ends running longitudinally with the slots in the upper side of the housing of the radio so that said slots extend parallel to each other and spaced apart in planes normal to each other; to provide means for mounting of the radio to the bottom of the dash of the vehicle consisting of an L-shaped bracket or arm having one arm thereof extending through the slot in the top near each end of the housing of the radio and pivotally mounting such arm by a metal screw or the like extending through the slot in the ends of the housing of the radio so that the bracket will pivot to a position conforming to the bottom of the dashboard; to provide for mounting of the radio on a level when the bottom of the dashboard or housing of the dashboard is uneven or nonplanar; to provide for mounting the bracket to the bottom of the housing of the panel of the vehicle by metal screws or the like; and to provide a device of this character simple and economical to manufacture.

Other objects and advantages of this invention will become apparent from the following description taken in connection with the accompanying drawings wherein are set forth by way of illustration and example certain embodiments of this invention.

FIG. 1 is a front view of the radio shown attached underneath the panel of an automobile or other vehicle.

FIG. 2 is an end view of the radio shown attached underneath the dash of an automobile or other vehicle with parts in cross section to better illustrate the invention.

FIG. 3 is a partly cross-sectional view of the mounting bracket showing mounting of the radio to the bottom of the dashboard of the vehicle.

FIG. 4 is an end view particularly illustrating the radio in a horizontal position under the dashboard of a panel of an automobile or the like which is not level or which is off of the horizontal, and more particularly illustrating the pivotal mounting of the mounting bracket.

FIG. 5 is a fragmentary top plan view particularly illustrating the slot in the top of the housing of the radio.

Referring more in detail to the drawings:

1 designates a radio adapted to be attached to the bottom 2 of a panel or dashboard 3 of a vehicle or the like (not shown).

The radio consists of a front face 4 having the usual on and off and tuning knobs 5 and 6 and a dial or face as indicated at 7 (FIG. 1) to indicate the stations to which it is desired to be tuned. The radio has a considerably greater length as shown in FIG. 1 than the width thereof as shown in FIG. 2 so that it will be readily adapted to a horizontal portion of the bottom of the dashboard in various models of automobiles or other vehicles. The lesser width of the housing of the radio permits greater adjustment forwardly or rearwardly of the dashboard when mounting. The radio 1 has the usual electrical connections 8 to the electrical system of the automobile.

In order to mount the radio underneath the dashboard of a vehicle, I provide the top wall 9 of the casing or housing 10 of the radio near the end walls 11 and 12 thereof with an elongated slot 12' (FIGS. 3 and 5). The end walls 11 and 12 of the housing 10 of the radio are provided near the top thereof but spaced therefrom with an elongated slot 13, shown in FIGS. 2 and 3. The slots 12' are slightly longer than the slots 13 to allow pivoting of mounting brackets 14 and 15.

The brackets 14 and 15 have vertically extending arms 16 and 17 adapted to extend through the openings 12' in the top 9 of the casing downwardly into the housing as indicated in FIG. 3. The arms 16 and 17 (not shown) of the brackets 14 and 15 are pivotally mounted to the ends 11 and 12 of the housing 10 by metal screws or the like 18 and 19 which extend through the slot 13 in the ends 11 and 12 of the casing and into and through the arms 16 and 17 of the brackets. The brackets 14 and 15 are provided with arms 20 and 21 which are adapted to extend horizontally and lie against the bottom 2 of the dashboard of the panel of the vehicle and be secured thereto by metal screws or the like 22 and 23 as best illustrated in FIG. 2. The screws extend through openings (not shown) in the arms 20 and 21. This fastening means is also shown in FIG. 3.

In FIG. 4 there is illustrated the top 9 of the casing 10 of the radio in a horizontal position with the bottom 24 of the panel 3' at an angle thereto and the brackets 14 (not shown) and 15 shown pivoted at an angle as indicated at 25 or slightly rotated with respect to the casing 10 of the radio so that the radio may be easily attached to the bottom of a panel or vehicle which is not level or horizontal or of non-planar configuration.

It will be obvious that with this form of invention the radio may be readily adaptable and adjustable to the various slants or irregularities found in the different model automobiles. It will also be obvious that with the present invention, the radio is extremely easy to mount underneath the dash or panel of a vehicle requiring less time, expense and material.

The elongated slots 13 in the end of the radio allows for adjustment of the radio forwardly or rearwardly with respect to the panel or dashboard as the screws 18 are readily accessible for loosening and movement of the radio with respect to the brackets when the brackets are secured underneath the dashboard of the vehicle or the adjustment may be made before mounting of the radio to the dashboard. Elongated openings 12' in the top of the housing also permit easy adjustment of pivoting of the bracket on the screws 18.

It will be obvious from the foregoing that I have provided new configuration for radios and the means for mounting the same to the bottom of the dash of a vehicle and one which may be readily and easily secured to such vehicle and removed therefrom and wherein the radio knobs and adjustments are readily accessible to the driver of the vehicle.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. The combination of a radio housing including end walls connected to a top wall, said top wall having elongated slots parallel to and adjacent said end walls, and said end walls having elongated slots spaced from the top wall and extending in the same direction as the first named slots, L-shaped brackets having vertical arms extending through the slots in the top wall, means pivotally mounting said arms to said ends of the housing, arms on the brackets extending outwardly of the ends of the housing in the plane of the top wall, and means for securing the last named arms to the bottom of a dashboard.

2. The apparatus of claim 1 wherein said means pivotally mounting the arms of the brackets consists of screws extending through the slots in the end walls and engaging in said vertical arms.

3. The apparatus of claim 2 wherein said means for securing said second named arms to a dashboard are screws extending through said arms.

4. The apparatus of claim 1 wherein said slots extend parallel to each other and are spaced apart in planes normal to each other.

5. The combination of a radio housing including end walls connected to a top wall, said top wall having elongated slots parallel to and adjacent said end walls, and said end walls having elongated slots spaced from the top wall, said slots extending parallel to each other and being spaced apart in planes normal to each other, slots in the top wall being longer than the slots in the end walls, L-shaped brackets having vertical arms extending through the slots in the top wall, means pivotally and adjustably mounting said arms to said ends of the housing, arms on the brackets extending outwardly of the ends of the housing in the plane of the top wall, and means for securing the last named arms to the bottom of a dashboard.

6. The apparatus of claim 5 wherein said means pivotally mounting the arms of the brackets consists of screws extending through the slots in the end walls and connected to said vertical arms.

7. The apparatus of claim 6 wherein said means for securing said second named arms to the dashboard are screws extending through said arms.

8. The apparatus of claim 1 wherein said radio housing is of less width than the length thereof to permit adjustment forwardly and rearwardly of a dashboard.

9. The apparatus of claim 5 wherein said radio housing is of less width than the length thereof to permit adjustment forwardly and rearwardly of a dashboard.

References Cited by the Examiner

UNITED STATES PATENTS

| | | | |
|---|---|---|---|
| 1,764,856 | 6/1930 | Ryder | 248—201 |
| 1,997,254 | 4/1935 | Forsythe | 325—312 |
| 2,942,830 | 6/1960 | Senay | 248—201 |
| 3,087,118 | 4/1963 | Goffstein | 325—312 |

CLAUDE A. LE ROY, *Primary Examiner.*

W. D. LOULAN, *Assistant Examiner.*